United States Patent
Young et al.

[11] Patent Number: 5,951,235
[45] Date of Patent: Sep. 14, 1999

[54] ADVANCED ROLLBACK WHEEL-LIFT

[75] Inventors: Charles E. Young, Falling Waters, W. Va.; David D. Hedstrom, St. Thomas, Pa.

[73] Assignee: Jerr-Dan Corporation, Greencastle, Pa.

[21] Appl. No.: 08/827,701

[22] Filed: Apr. 8, 1997

Related U.S. Application Data

[60] Provisional application No. 60/023,734, Aug. 8, 1996.

[51] Int. Cl.$^6$ ........................................................ B60P 3/12
[52] U.S. Cl. ........................... 414/563; 280/402; 414/480
[58] Field of Search ..................... 414/563, 495, 414/482, 480, 501, 426, 427, 428, 429, 430, 539, 540, 541, 546, 547, 553, 558, 917; 254/3 R, 3 C; 280/402

[56] References Cited

U.S. PATENT DOCUMENTS

| | | |
|---|---|---|
| 4,700,852 | 10/1987 | Mjöberg ................................. 212/189 |
| 4,795,303 | 1/1989 | Bubik . |
| 4,797,057 | 1/1989 | Shoup et al. . |
| 5,035,462 | 7/1991 | Page et al. . |
| 5,061,147 | 10/1991 | Nespor . |
| 5,236,214 | 8/1993 | Taylor ..................................... 280/402 |
| 5,354,167 | 10/1994 | Cullum et al. .......................... 414/563 |

FOREIGN PATENT DOCUMENTS

| | | |
|---|---|---|
| A 2690883 | 11/1993 | France . |
| A 2520645 | 11/1976 | Germany . |
| A 2238290 | 5/1991 | United Kingdom . |

*Primary Examiner*—Frank E. Werner
*Attorney, Agent, or Firm*—McDermott, Will & Emery

[57] ABSTRACT

An improved wheel-lift apparatus attachable to various types of transport trucks, including rollback trucks for loading and carrying disabled vehicles. The improved wheel-lift apparatus provides a horizontal extendable boom mechanism long enough for receiving disabled vehicles. As a result of the wheel-lift's "low angle" or horizontal approach, the risk of damage occurring to the chassis or body of the disabled vehicle while in the loading and carrying modes is greatly diminished.

22 Claims, 20 Drawing Sheets

ADVANCED ROLLBACK WHEEL-LIFT

This application is based, in part, on U.S. Provisional Application No. 60/023,734, having a filing date of Aug. 8, 1996.

BACKGROUND OF THE INVENTION

Transporting and towing vehicles such as damaged automobiles and the like, show cars, antique vehicles of various types and other similar transportation type of vehicles has become quite popular in recent years and the development of transport trucks to convey such vehicles has been undertaken.

Transport vehicles having rollback decks are well known as a means for transporting vehicles. U.S. Pat. No. 5,133,633, issued to "Grata" on Jul. 28, 1992, entitled "Low-Angle Slidably Supported Roll-Back Vehicle Transport Apparatus", which is incorporated herein by reference, illustrates one type of transport vehicle having a rollback deck. As detailed therein, such transport vehicles include a vehicle support surface or the rollback deck movably mounted on a truck bed frame. Specifically, the vehicle support surface is pivotable relative to the truck bed frame between a transport position and a loading position. In the transport position, the support surface is parallel to the bed frame. In the loading position, the support surface is at an angle relative to the bed frame such that it contacts the ground so as allow a disabled vehicle to be rolled thereon.

Another method of towing and transporting vehicles is the wheel-lift apparatus. Typical wheel-lift apparatuses carry disabled vehicles by lifting either the front or rear wheels off the ground, and towing the partially-lifted disabled vehicle on its remaining two wheels. U.S. patent application Ser. No. 08/555,211, filed on Nov. 8, 1995, now U.S. Pat. No. 5,713,714 entitled "Tilt Cylinder For an Underreach Assembly", which is incorporated herein by reference, illustrates one type of wheel-lift apparatus.

Other early versions of the lifting or towing vehicles have a wheel-lift apparatus in which the boom and related lifting mechanism are located beneath the deck of the lifting and towing vehicle; see U.S. Pat. No. 5,269,553, issued to "Alonso" on Dec. 14, 1993, entitled "Towing Apparatus and Thrust Reversal Mechanism Therefor". As shown in Alonso, the wheel-lift apparatus boom has an inner end pivotally mounted adjacent the rear axle and a wheel supporting cradle at an outer end. Similarly, U.S. Pat. No. 5,061,147, issued to "Nespor" on Oct. 29, 1993 (Reexamination Certificate No. B1 5,061,147, issued on Feb. 25, 1997), entitled "Vehicle Carrier with Wheel Lift", discloses a wheel-lift apparatus boom having an inner end pivotally mounted to struts and a bracket adjacent the rear axle and a wheel supporting cradle at an outer end. Each of the Alonso and Nespor booms are outwardly extended by hydraulic cylinders at an angle raised substantially from horizontal to the ground. Such devices suffer from a number of deficiencies, as explained below.

For example, referring to Alonso and Nespor, by utilizing a boom raised at a substantial slope to connect the wheel supporting cradle to the lifting or towing vehicle, there is a possibility of the supporting cradle or the boom hitting the disabled vehicle, often resulting in significant damage to the disabled vehicle. In some types of vehicles, such as vans and jeeps, the danger is minimal since there is a very short distance between the bumper and the adjacent wheel axle. However, on vehicles where there is substantial overhang of the body or chassis, beyond the rear and/or front axle the likelihood of damage to the disabled vehicle by the lifting wheel-lift apparatus is significant. A 1996 "CHEVROLET CAMARRO" is an example of a car which is likely to be damaged by many known wheel-lift apparatuses.

FIGS. 10 and 12 illustrate typical prior art wheel-lift apparatuses of a rollback transport vehicle. Referring to FIGS. 10 and 12, the conventional boom extends in the loading position with an angle substantially greater than horizontally parallel to the ground. The conventional boom hits the disabled vehicle because the slope and height of the boom is too great while it approaches the car in the loading position and/or lifts the car in the carrying position.

None of the patents described above provides the important advantages associated with towing vehicles comprising a boom capable of a substantial reach while maintaining a horizontally aligned or "low angle" approach and lift, between about −15 and 15 degrees during loading and carrying, respectively. In this manner an approach and lift is provided in which the boom operates horizontally to the ground.

BRIEF SUMMARY OF THE INVENTION

According to this invention, wheel-lift apparatuses are mounted on various types of lifting or towing vehicles (recovery vehicles), such as rollback or tow trucks. The wheel-lift apparatus is provided with means for carrying a disabled vehicle by elevating or lifting and supporting one end of the disabled vehicle while the opposite end of the disabled vehicle is supported by its own wheels rotating along the ground.

As pointed out in greater detail below, the important advantage of the present invention is that the wheel-lift apparatus incorporates a horizontal approach boom. In this manner, a boom capable of a "low angle" approach is provided which is horizontal to the ground for loading the disabled vehicle, as well as for lifting and carrying the disabled vehicle.

The "low angle" approach allows the boom to remain horizontal to the slope of the ground surfaces where the recovery and disabled vehicles are located. The range of the "low angle" approach is between about −15 and 15 degrees. Indifferent to whether the particular ground surfaces are inclined, declined or level, the "low angle" approach enables the boom(s) to be horizontal with the slope of the ground surfaces. As a result, this enables the disabled vehicle to be lifted and carried with minimal risk of damage to the chassis or frame of the disabled vehicle.

According to the invention, the wheel-lift apparatus comprises extendible booms, a wheel supporting cradle, and hydraulically activated cylinders for raising and lowering the booms and the wheel supporting cradle located below the deck of the lifting, towing, or transport vehicle (recovery vehicle). The wheel-lift apparatus is suitable for attaching to a truck subframe. A pair of lift cylinders are each pivotally connected to the truck frame or subframe and to the outer end of a base boom which has its inner end connected to an inner tilt boom. The inner tilt boom, containing a tilt cylinder, has one end attached to the truck frame or subframe and the other end to the inner end of the base boom. The attachment of the inner tilt boom to the truck subframe takes place in an inner tilt housing which is located on the truck subframe. At the outer end of the base boom is a fly boom extendable from the outer end of base boom. At the outer end of the fly boom is the wheel supporting cradle which is also telescopically extendable out of the fly boom. The tilt cylinder and lift cylinder are operated hydraulically either in conjunction with or independent from each other for movement between the transport and loading positions.

As a variation to the tilt cylinder, the tilt cylinder is installed without the accompaniment of an inner tilt boom. Rather, a heavy duty tilt cylinder has one end attached to the truck frame or subframe and the other end to the inner end of the base boom (without the being disposed inside an inner tilt boom).

Various embodiments of the invention are possible. For example, a pair of struts may have one of their ends fixably attached to the truck subframe or frame and the other end pivotably attached to the inner end of the base boom, at the point where a pair of inner tilt booms are also pivotably attached to the base boom.

The wheel-lift apparatus is operated during loading by the hydraulic actuator supplying up to about 40 percent of the hydraulic fluid to the tilt cylinder and up to about 60 percent of the hydraulic fluid to the lift cylinder causing the lift cylinder and the tilt cylinder to react (retract and expand) at different speeds relative to one another. Distributing the hydraulic fluid, as mentioned above, between the tilt cylinder and the lift cylinder, rather than designating all the hydraulic fluid to the lift cylinder in absence of a tilt cylinder as in prior art apparatuses, allows the base boom to operate at less of a slope and thus be positioned horizontally to the ground. As a result, one of the advantages of the present invention is achieved by having the respective booms and wheel supporting cradle approach the disabled vehicles at a horizontal or "low angle" loading position.

The wheel supporting cradle for engaging the tires include a wheel support boom telescopically extendable from the fly boom and a crossbar connected to the wheel support boom and at each end of the cross bar a housing connects an arm extending rearwardly from the crossbar, and generally perpendicular thereto, with a rear support attached which extends inwardly thereby forming an L-shaped support for each of the respective wheels. Each of the two L-shaped supports of the wheel supporting cradle engages the lower portion of a vehicle wheel.

The advantage of the present invention is that the wheel-lift apparatus operates a boom in the horizontal loading or carrying positions having a significant extension length whereby the risk of damage to the chassis or frame of the disabled vehicle due to contact between the boom or wheel supporting cradle and the frame/chassis is greatly diminished compared with the prior art cited above.

As can be seen from above, the present invention provides numerous other advantages. The horizontal, "low angle", wheel-lift apparatus enables superior clearance under disabled vehicles which are especially low to the ground.

Another advantage of the present invention is to provide a transport or tow truck having a wheel-lift apparatus which is relatively easy to engage with a disabled vehicle loading and carrying which provides for such engagement without undue maneuvering of the truck.

Still another advantage of the present invention is the provision of a transport truck or tow-truck (recovery vehicle) having a wheel-lift apparatus which will be able to load and carry a disabled vehicle without the substantial danger of tipping of the transport truck and subjecting the disabled vehicle to additional damage.

Further advantages include the provision of a transport truck or tow truck (recovery vehicle) with a wheel-lift apparatus having a very large range of reach between retracted and extended boom positions, to provide such a range of reach using the multiple booms, and to provide an economical and strong truck which does not require positioning immediately adjacent to the disabled vehicle.

The invention itself, together with further objects and attendant advantages, will best be understood by reference to the following detailed description taken in conjunction with the accompanying drawings.

DETAILED DESCRIPTION OF A PREFERRED EMBODIMENT

Figure 1:
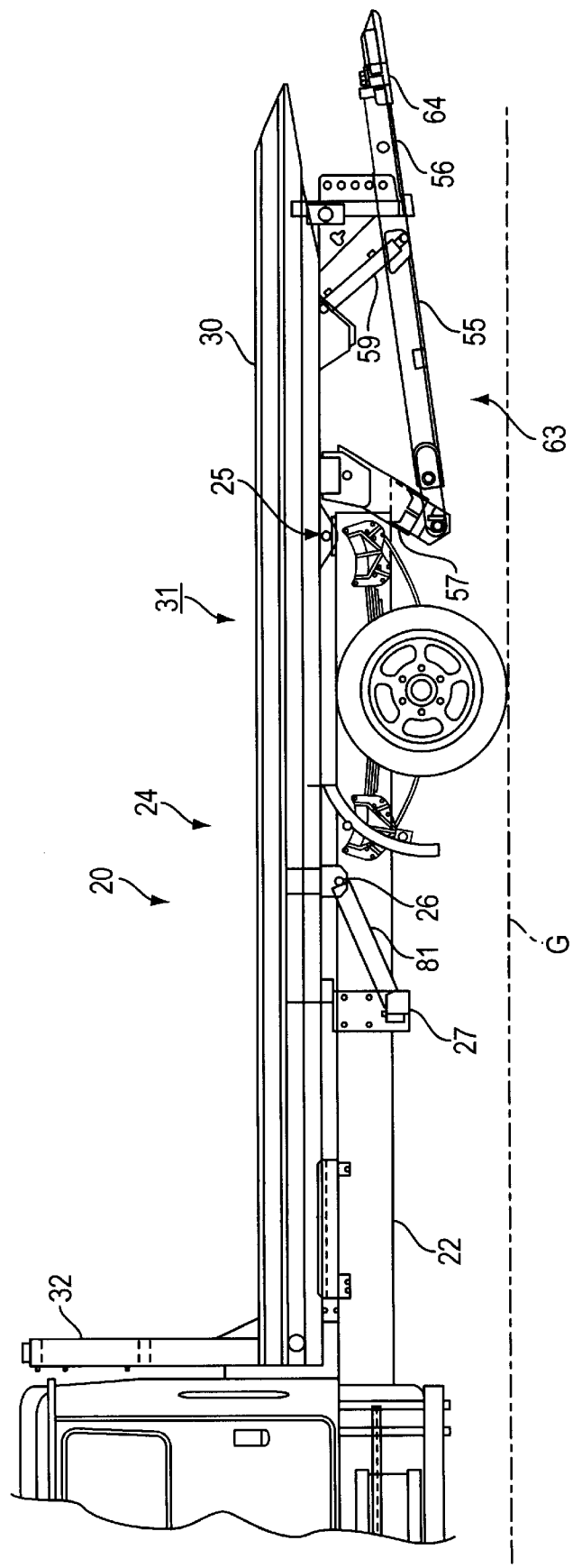
FIG. 1 is a side view showing a rollback truck with a wheel-lift apparatus attached below the rollback truck subframe, wherein the rollback deck is in a rollback position and the wheel-lift is in a stored position.
Figure 2:
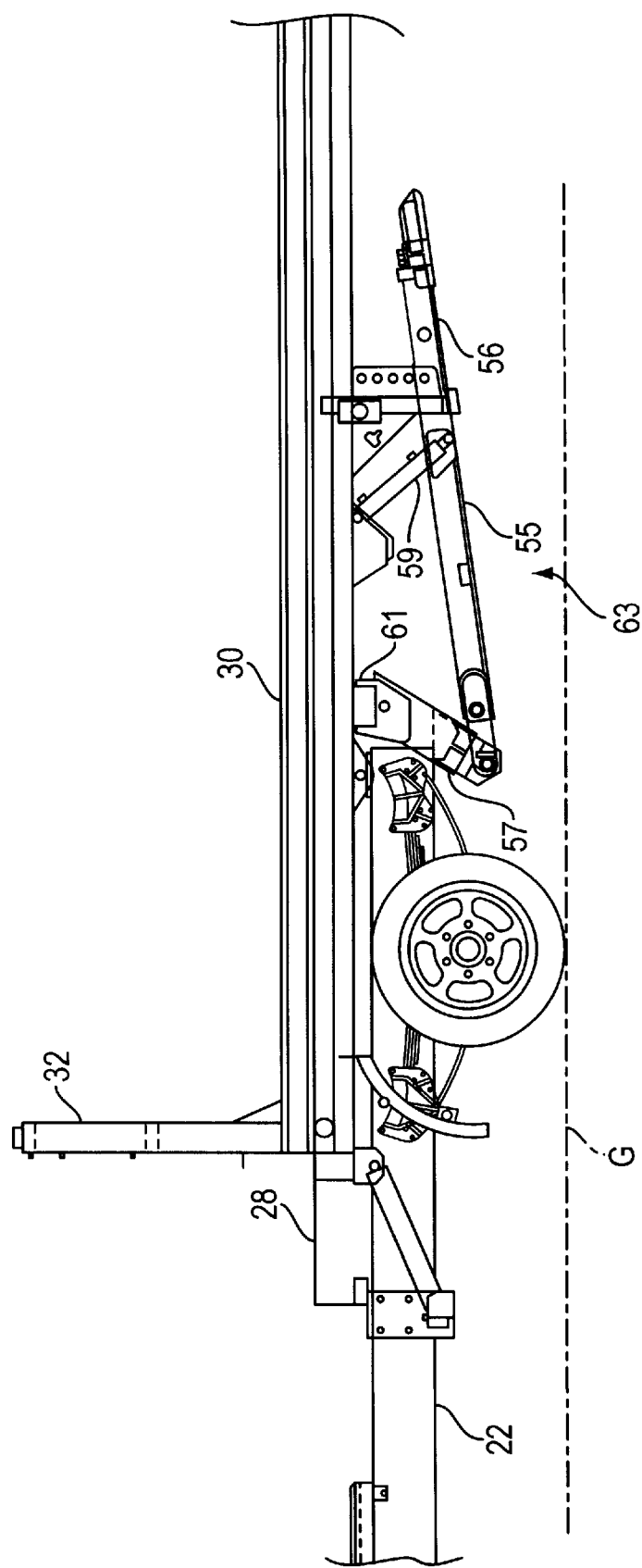
FIG. 2 is a side view showing a rollback truck with a wheel-lift apparatus attached below the rollback truck subframe, wherein the rollback deck is in an intermediate position and the wheel-lift is in a stored (stowed) position.
Figure 3:
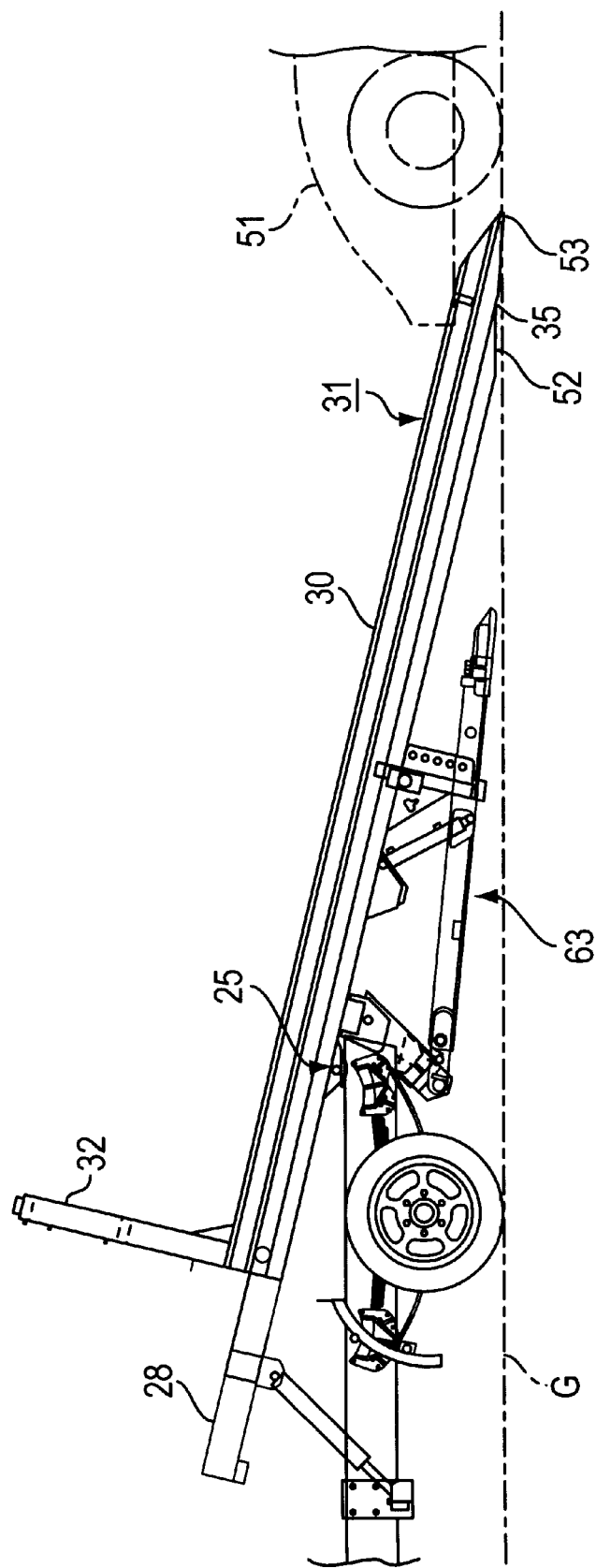
FIG. 3 is a side view of a rollback truck with a wheel-lift apparatus attached below the rollback truck subframe, wherein the rollback is in a loading position.

Turning now to the drawings, wherein like or corresponding reference numerals are used for like or corresponding parts throughout the figures, as best shown in FIGS. 1–3, a rollback assembly 20 includes a truck bed frame (or "bed frame") 22 which mounts to a deck support surface assembly 24 at a pivot point 25. A cylinder 81 is connected between a pair of points 26 and 27 for driving the deck support surface assembly 24 to pivot relative to the bed frame 22 and move the deck from the transport position, illustrated in FIG. 1, to a loading position, illustrated in FIG. 3. The deck support surface assembly 24 includes a subframe 28 pivotally connected at the pivot point 25 of the truck bed frame 22, and a deck portion 30 which is slidable relative to the subframe 28.

Further, merely by way of example, there are shown a deck portion 30 which defines a surface 31 which supports a vehicle to be transported. A forward end 32 of the deck portion 30 is defined at one longitudinal end of the rollback assembly 20. The movement of the rollback assembly 20 from the transport(rollback) position illustrated in FIG. 1 to a loading position will be explained with reference to FIGS. 2 and 3. When it is desired to move the rollback assembly 20 to the loading position, the deck portion 30 is first driven rearwardly relative to the subframe 28 through some conventional means, typically hydraulic cylinders or screw actuators driven by a screw motor are utilized. The rollback assembly 20 is illustrated in FIG. 2 with the deck portion 30 having been moved rearwardly relative to the subframe 28. As the deck portion 30 initially begins to move rearwardly from the transport(rollback) position, this rearward movement continues until the members arrive at the intermediate position illustrated in FIG. 2.

FIG. 3 illustrates the rollback assembly 20 in the loading position. A bottom face 35 contacts the ground over an area extending from point 52 to point 53.

Once in the loading position, a disabled vehicle 51 can be moved onto the surface 31, by wrench or some other means, and the rollback assembly 20 may then move back to the transport(rollback) position. Initially, the subframe 28 is pivoted relative to the bed frame 22 to return to the intermediate position illustrated in FIG. 2. The deck portion 30 is then moved forwardly relative to the subframe 28 to return the deck to the transport(rollback) position, illustrated in FIG. 1.

As the deck portion 30 initially begins to move forwardly from the intermediate position, this forward movement of the deck portion 30 relative to the subframe 28 or frame 22 continues until the deck portion 30 has returned to the transport(rollback) position illustrated in FIG. 1.

Figure 4:
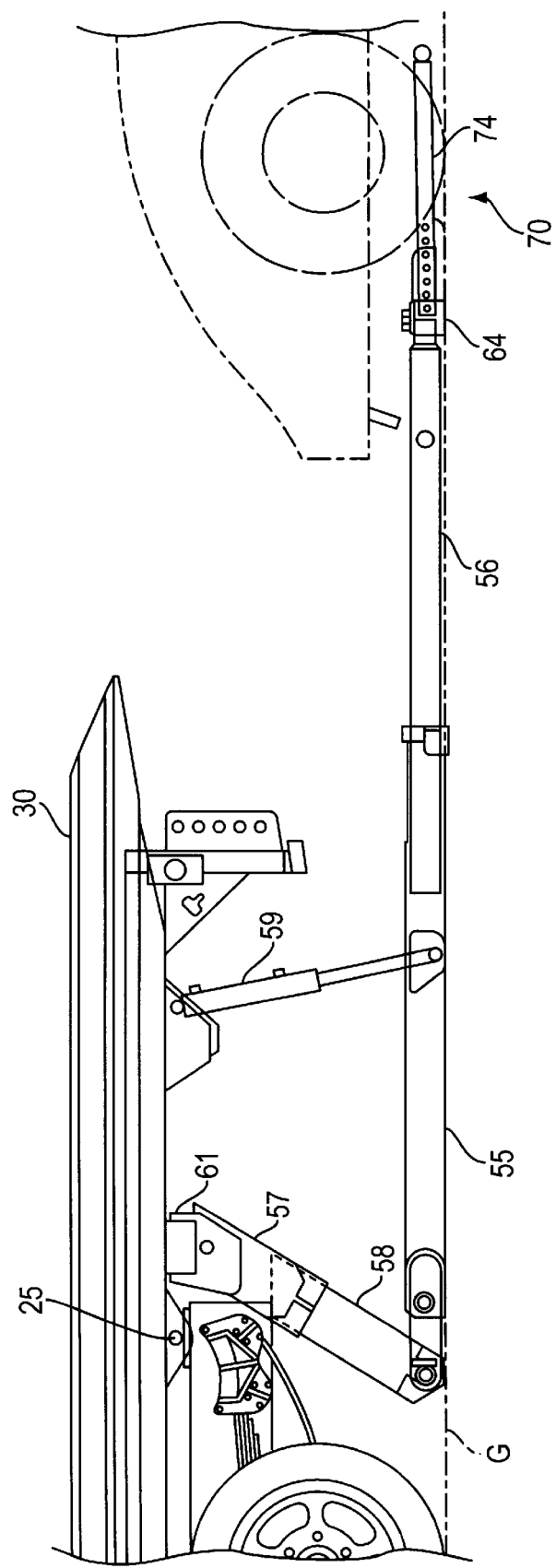
FIG. 4 is a side view of the wheel-lift apparatus attached below the rollback truck subframe, wherein the wheel-lift is in a loading position such that it is horizontal and in contact with the ground surface.
Figure 5:
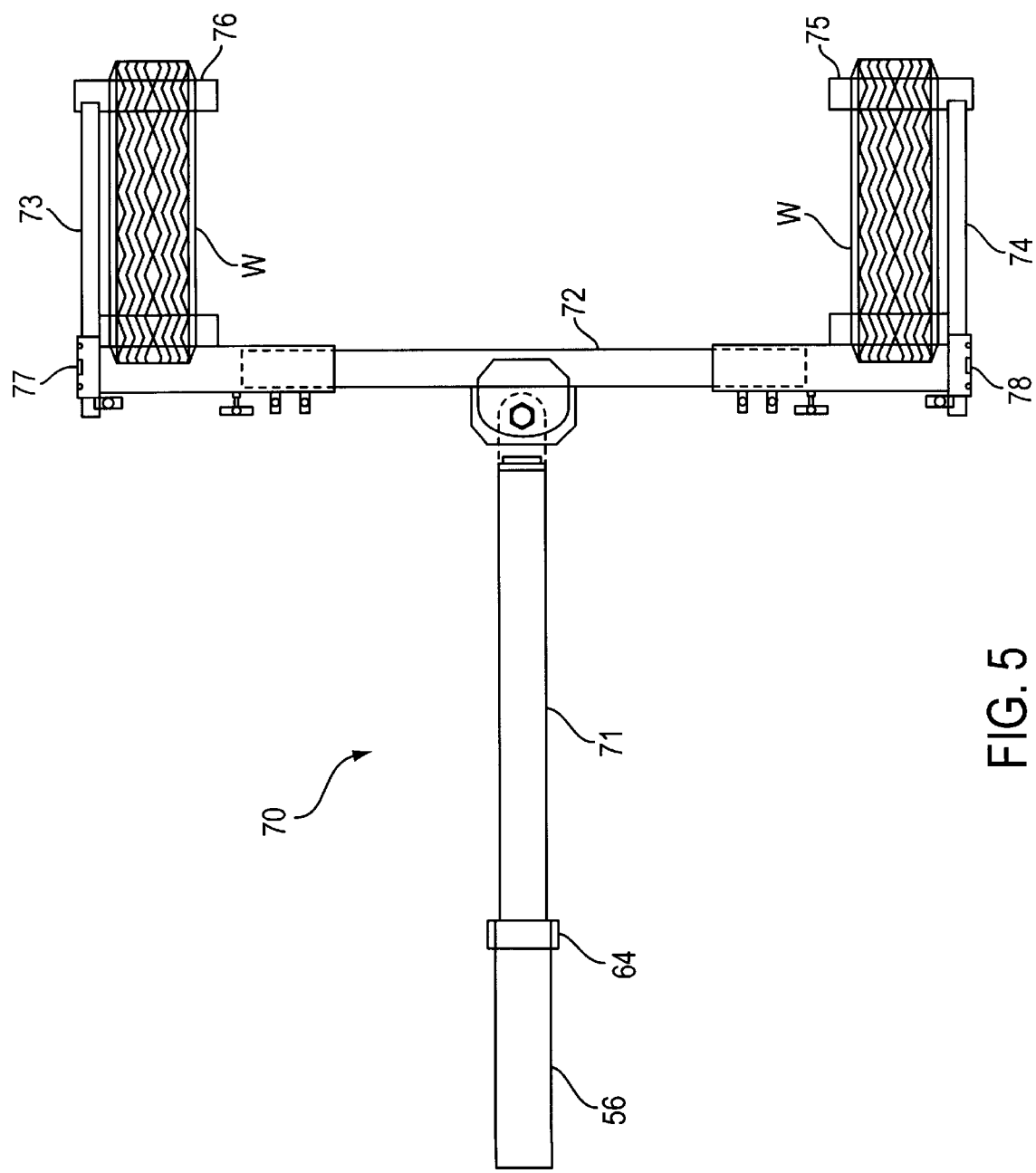
FIG. 5 is a plan view of the wheel-lift apparatus wheel supporting cradle.

Regardless of whether the rollback assembly 20 has loaded a disabled vehicle 51 onto the deck portion 30 to be transported, the wheel-lift apparatus 63 will accommodate another disabled vehicle to be loaded and carried. As best shown in FIG. 4, a wheel-lift apparatus 63 mounted below the subframe 28 or frame 22 having an inner tilt boom 57 extending downward from the tilt housing 61 attached on the underside of the subframe 28 or fame 22 and a lift cylinder 59 extending downward and pivotally attached to the subframe 28 whereby a base boom 55, which may be positioned to be horizontal to or in contact with the ground G, pivotally links the lower ends of the inner tilt boom 57 and lift cylinder 59. A tilt cylinder 58 located within the inner tilt boom 57 is operated either in conjunction with or independently with the lift cylinder 59 for lowering and raising the base boom 55. A fly boom 56 which is telescopically extendable from the outer end of the base boom 55 which may be positioned to be horizontal to or in contact with the ground G has a "low profile" pivot 64 at its outer end so as to telescopically connect the wheel supporting cradle 70 for engaging the wheel W of the disabled vehicle which is to be loaded.

As a variation to the tilt cylinder, the tilt cylinder is installed without the accompaniment of an inner tilt boom. Rather, a heavy duty tilt cylinder has one end attached to the truck frame or subframe and the other end to the inner end of the base boom (without the being disposed inside an inner tilt boom).

Figure 8:
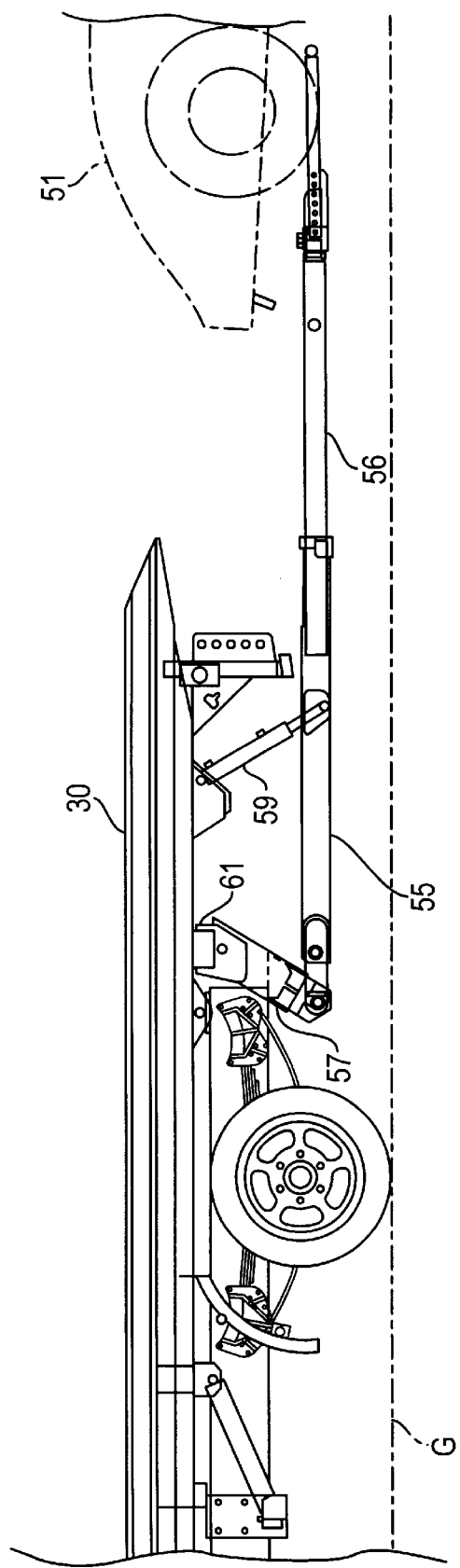
FIG. 8 is a side view of the wheel-lift apparatus attached below the rollback truck subframe, wherein the wheel-lift is in a carry position such that it is exactly horizontal.
Figure 9:
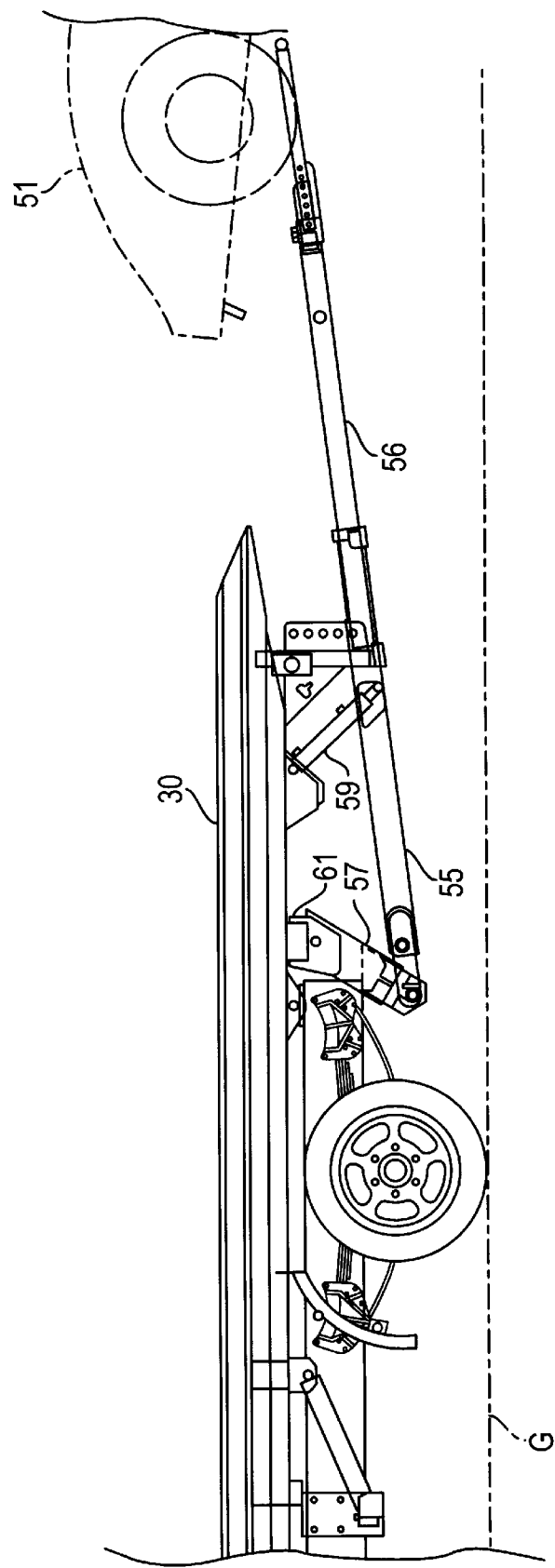
FIG. 9 is a side view of the wheel-lift apparatus attached below the rollback truck subframe, wherein the wheel-lift is in a carry position such that it is aligned at an angle substantially above the horizontal.
Figure 10:
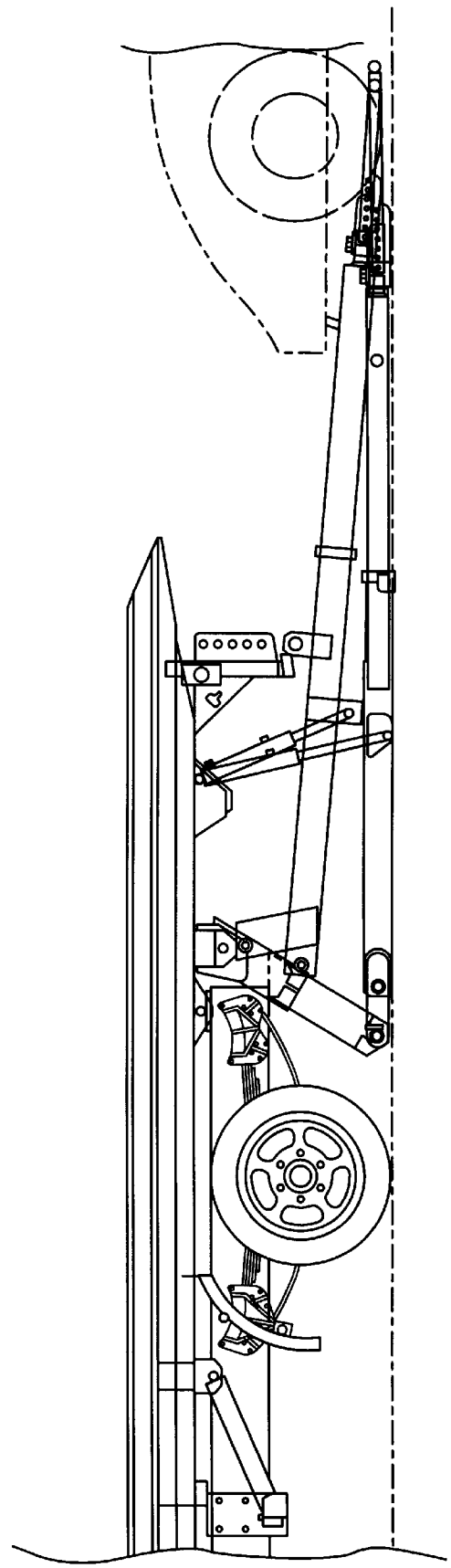
FIG. 10 is a side view comparing a conventional design with the present invention design of a wheel-lift apparatus attached below a rollback truck subframe. The wheel-lift load position of the conventional design is at an angle above the horizontal while the present invention design is horizontal.

Merely by way of example, the disabled vehicle will then be lifted and then towed in its carry position, as illustrated in FIGS. 8 and 9. The horizontal boom approach upon the disabled vehicle presents a significant advantage over the prior art whereby risk to chassis or body is greatly diminished. This is because the horizontal, low angle, loading or carrying positions of the boom, having significant extension length capabilities, reduces the risk of the chassis or frame of the disabled vehicle from coming into contact with the fly or base booms 56,55 or wheel supporting cradle 70.

Returning to FIG. 4, the wheel-lift apparatus 63 is positioned to engage either the forward or rearward wheels W of the disabled vehicle. The tilt cylinder 58 and the lift cylinder 59 are raised and lowered in conjunction with each other through some conventional means, typically an hydraulic actuator, a screw actuator driven by a screw motor, a pneumatic actuator, or various other mechanical devices (not shown), causing the base boom 55 to be raised or lowered in a horizontal position. The hydraulic circuit is controlled by at least one control lever (not shown) such that up to about 40 percent of the hydraulic fluid is delivered to the tilt cylinder 58 and up to about 60 percent to the lift cylinder 59 thus causing the lift cylinder 59 and tilt cylinder 58 to rise or lower at different speeds relative to one another, thereby providing the horizontal approach. Distributing the power as mentioned above between the tilt cylinder 58 and the lift cylinder 59, rather than designating all the power to the lift cylinder 59 in absence of the existence of a tilt cylinder 58 as in prior art apparatuses, allows the base boom 55 to operate at less of a slope and therefore more horizontal to the ground G. As a result, one of the advantages of the present invention is achieved by having the various booms and wheel supporting cradle 70 approach the disabled vehicles at a horizontal or "low angle" loading position.

The "low angle" approach allows the boom to remain horizontal to the slope of the ground surfaces where the recovery and disabled vehicles are located. The range of the "low angle" approach is between about −15 and 15 degrees. Indifferent to whether the particular ground surfaces are inclined, declined or level, the "low angle" approach enables the boom(s) to be horizontal with the slope of the ground surfaces. As a result, this enables the disabled vehicle to be lifted and carried with minimal risk of damage to the chassis or frame of the disabled vehicle.

Referring to FIGS. 4–9 and 11, the fly boom 56 is telescopically extendable, for example via hydraulic cylinders, from the base boom 55, while the wheel supporting boom 71 is also telescopically extendable, for example via hydraulic cylinders, at a low profile pivot 64 from the fly boom 56 and supports the wheel supporting cradle 70. The wheel supporting cradle 70 comprises the wheel supporting boom 71 extending rearwardly having a cross bar 72 and at each end of the cross bar 72, and generally perpendicular thereto, an arm 73,44 is connected by a conventional type housing 77,78. Attached to each arm 73,74 is a rear support 75,76 extending inwardly thereby forming an L-shaped support for each respective wheel W where the lower portion of the wheel W will be engaged for loading and carrying.

Figure 6:
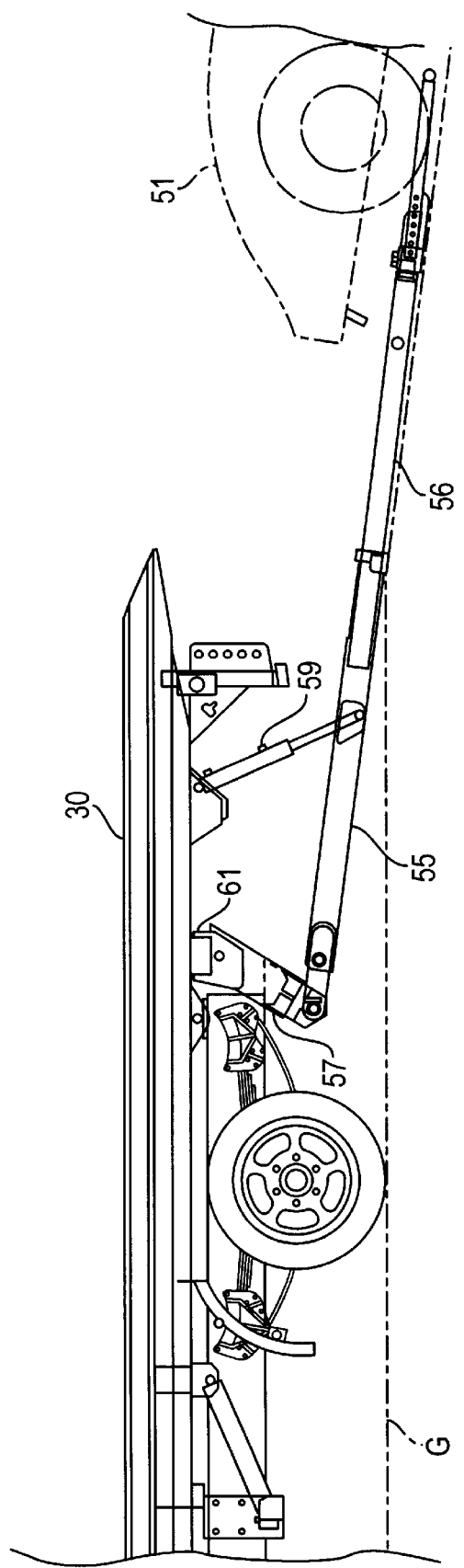
FIG. 6 is a side view of the wheel-lift apparatus attached below the rollback truck subframe, wherein the wheel-lift is in a loading position such that it is aligned at an angle below the horizontal and in contact with the ground surface, having a negative incline.
Figure 7:
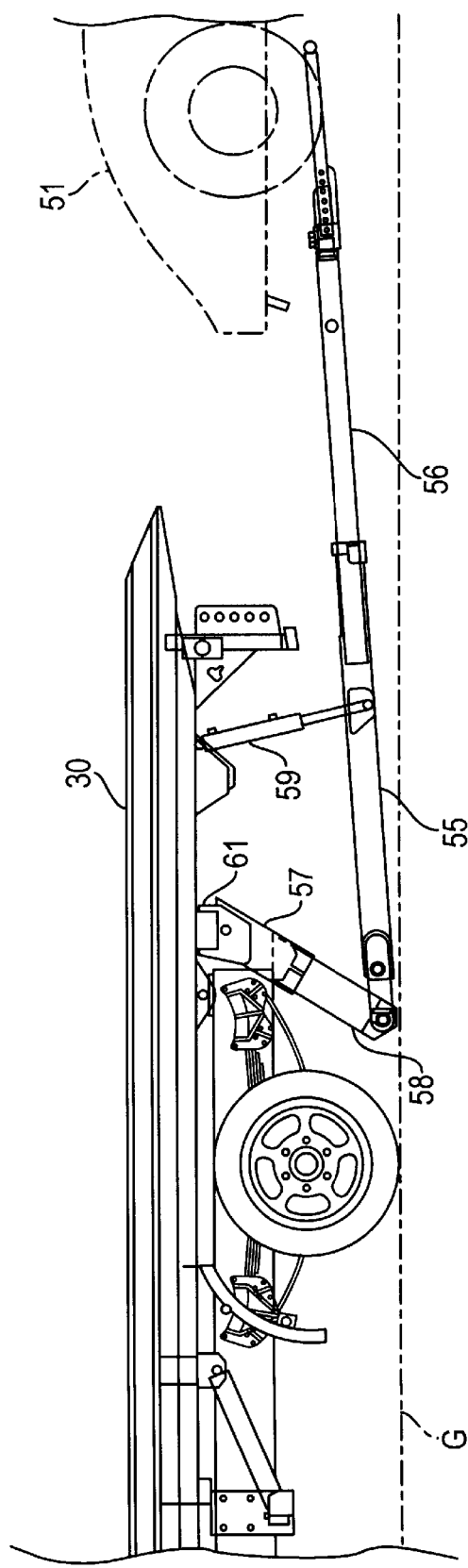
FIG. 7 is a side view of the wheel-lift apparatus attached below the rollback truck subframe and the wheel-lift is elevated first, from loading position, to clear the disabled vehicle understructure, so as to prepare for a carry position.

Various operating modes for the embodiments are possible. For example, as best shown in FIG. 6, base boom 55 can be raised or lowered in a substantially horizontal position with an angle below the horizontal so as to prepare for a low angle approach for a disabled vehicle located on a surface having a negative incline, i.e., a declining surface.

Finally, as additional examples, first shown in FIG. 8, the base boom 55 can be raised or lowered to precisely a horizontal position so as to tow the disabled vehicle in its carry position. After the wheels W of the disabled vehicle has been engaged by the wheel supporting cradle and the disabled vehicle is loaded and lifted then the vehicle is said to be in the carry position for transport. Next, as best shown in FIG. 9, the base boom 55 can be raised upwardly at a slope having an angle substantially above the horizontal for its carrying position.

Figure 11:
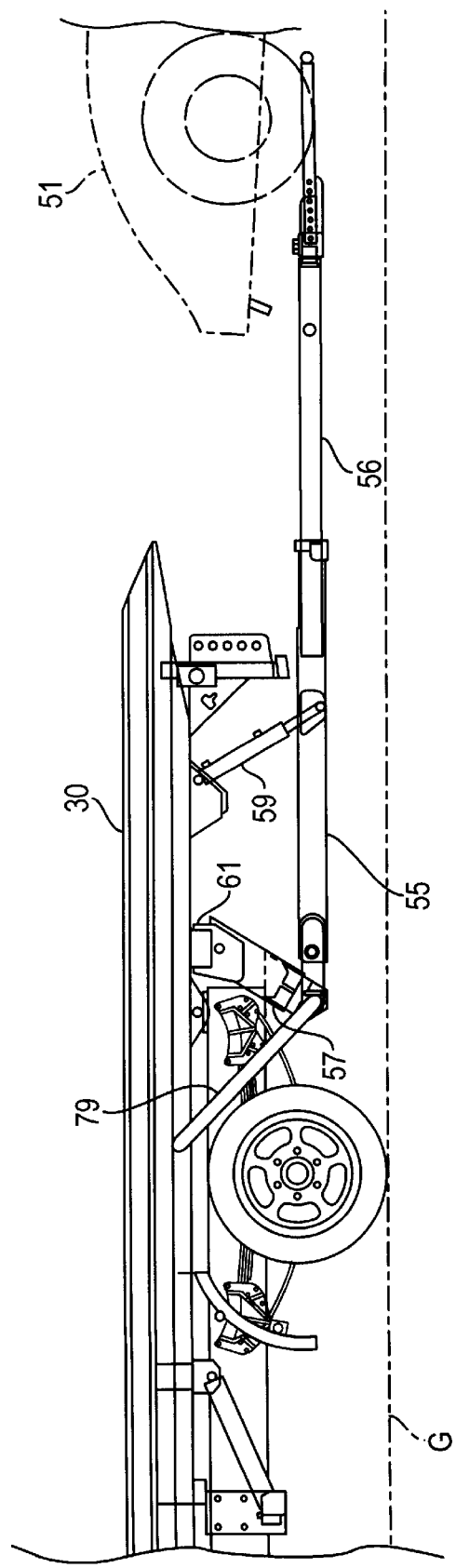
FIG. 11 is a side view of the second embodiment of the wheel-lift apparatus attached below the rollback truck subframe having a pair of struts mounting the wheel-lift to the subframe. The wheel-lift is in a carry position such that it is horizontal with the ground surface.
Figure 12:
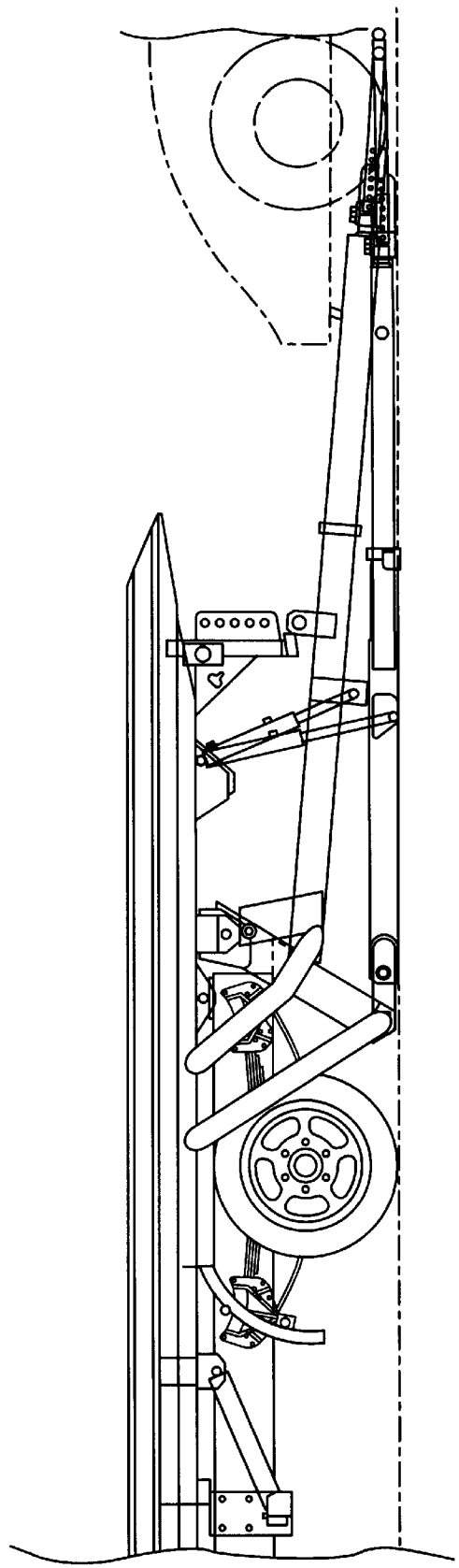
FIG. 12 is a side view comparing a conventional design with the second embodiment of the present invention design of the wheel-lift apparatus attached below a rollback truck subframe. The wheel-lift load position of the conventional design is at an angle above the horizontal while the present invention design is horizontal.

The second embodiment of the advanced rollback wheel-lift in accord with the present invention is shown in FIG. 11, wherein base boom 55 can be raised or lowered in a "low angle" horizontal position so as to tow the disabled vehicle in its carry position. This second embodiment, comprises a pair of struts 79 having one of their ends fixably attached to the truck subframe or frame and the other end pivotably attached to the inner end of the base boom, the same point as where a pair of tilt cylinders are also pivotably attached to the base boom.

Figure 13:
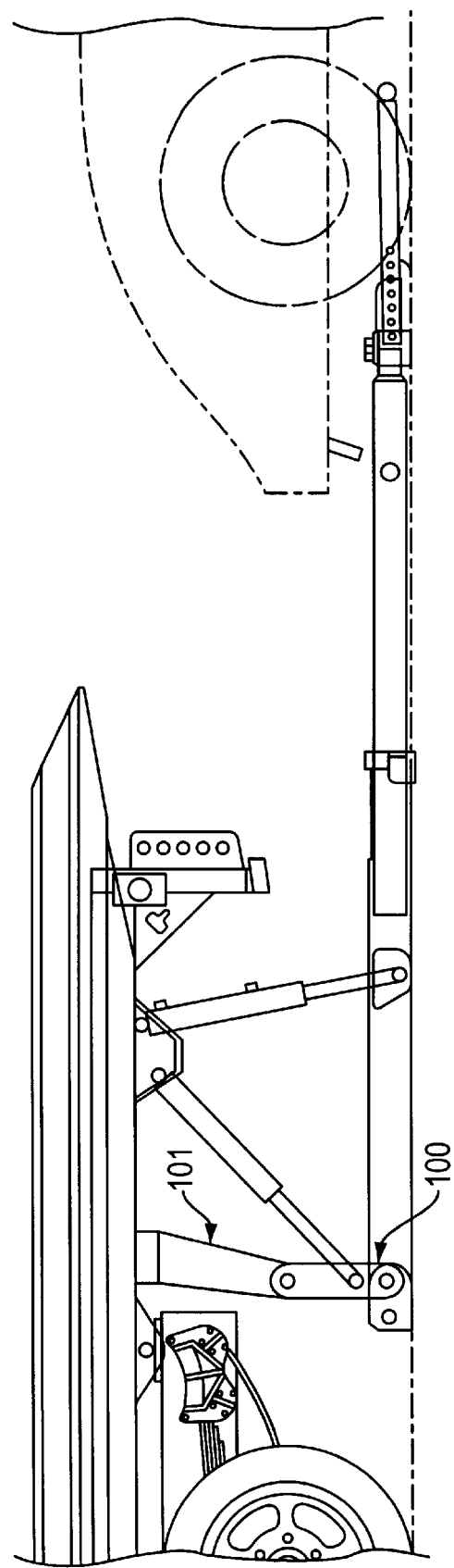
FIG. 13 is a side view of the third embodiment of the wheel-lift apparatus attached below the rollback truck subframe, wherein the wheel-lift is in a loading position such that it is horizontal and in contact with the ground surface.

The third embodiment of the advanced rollback wheel-lift in accord with the present invention is shown in FIG. 13, wherein a support 101 is attached to the truck frame and a pair of links 100 are connected between the support 101 and the front end of the base boom.

Figure 14:
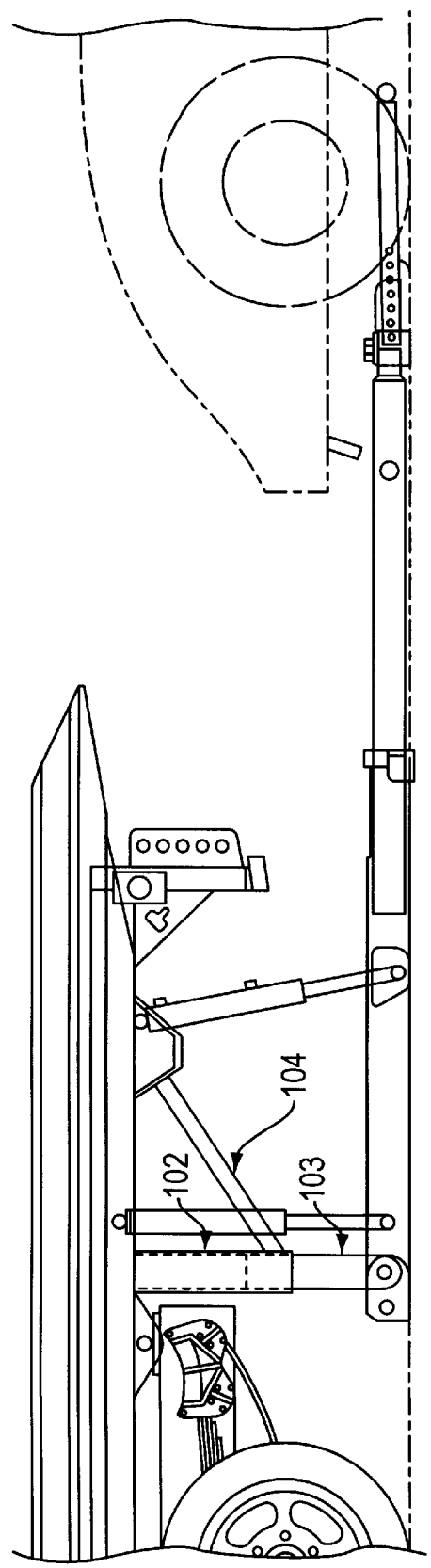
FIG. 14 is a side view of the fourth embodiment of the wheel-lift apparatus attached below the rollback truck subframe, wherein the wheel-lift is in a loading position such that it is horizontal and in contact with the ground surface.

The fourth embodiment of the advanced rollback wheel-lift in accord with the present invention is shown in FIG. 14, wherein an outer boom section 102 is attached to the truck frame and an inner boom section 103 is configured to be attached within the outer boom section 102 and connected to the front end of the base boom. A brace 104 is disposed to connect the outer boom section 102 to the truck frame proximate to where the lift cylinder(s) connects with the truck frame.

Figure 15:
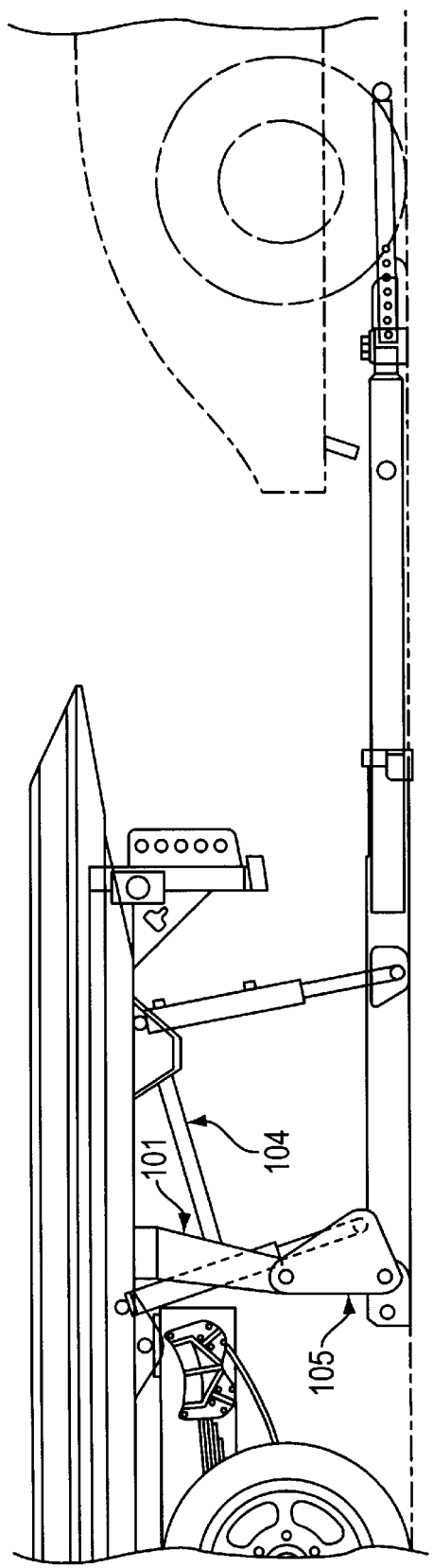
FIG. 15 is a side view of the fifth embodiment of the wheel-lift apparatus attached below the rollback truck subframe, wherein the wheel-lift is in a loading position such that it is horizontal and in contact with the ground surface.

The fifth embodiment of the advanced rollback wheel-lift in accord with the present invention is shown in FIG. 15, wherein a support 101 coupled with a triangle link 105 connects the front end of the base boom with the truck frame. A brace 104 is disposed to connect the support 101 to the truck frame proximate to where the lift cylinders connect with the truck frame.

Figure 16:
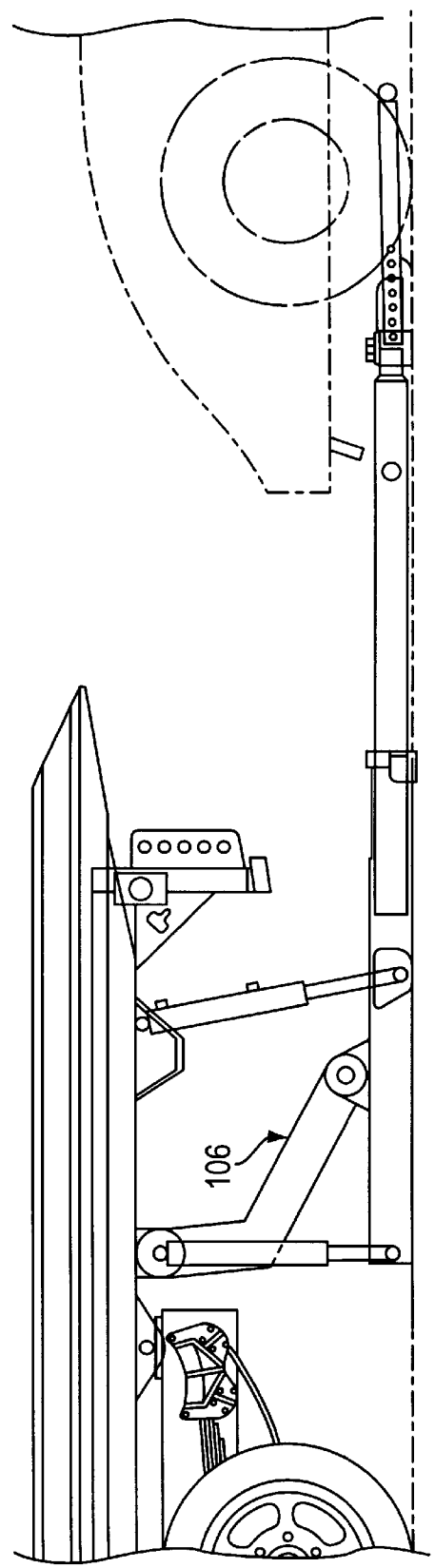
FIG. 16 is a side view of the sixth embodiment of the wheel-lift apparatus attached below the rollback truck subframe, wherein the wheel-lift is in a loading position such that it is horizontal and in contact with the ground surface.

The sixth embodiment of the advanced rollback wheel-lift in accord with the present invention is shown in FIG. 16, wherein a link arm 106 attaches to the truck frame at the portion of the base boom located between where the tilt cylinder and lift cylinder connects to the base boom. The link arm 106 has an elbow-like configuration.

Figure 17:
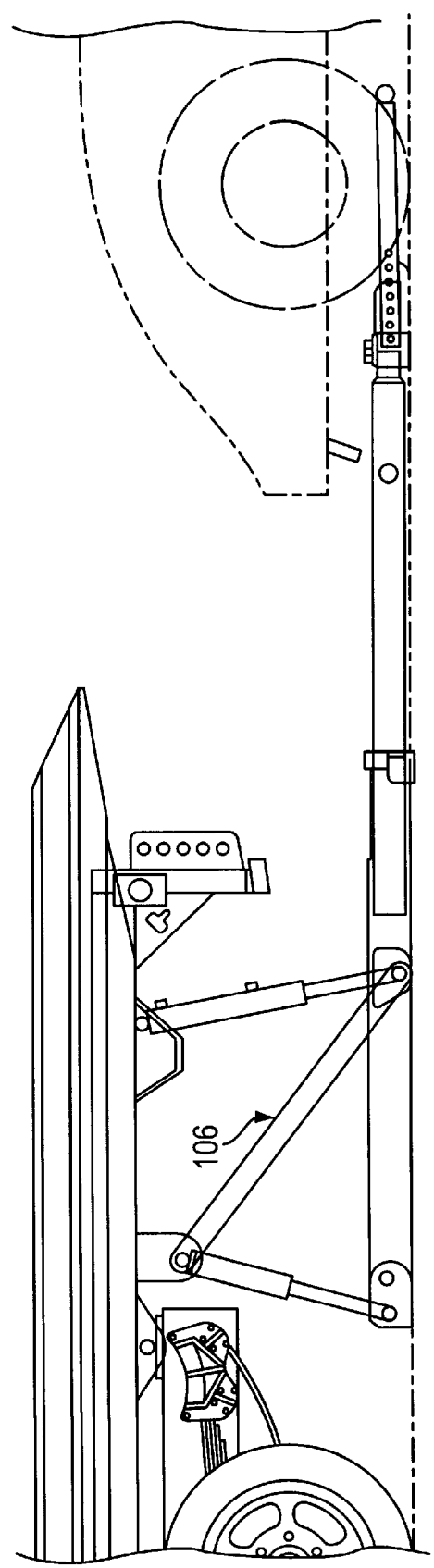
FIG. 17 is a side view of the seventh embodiment of the wheel-lift apparatus attached below the rollback truck subframe, wherein the wheel-lift is in a loading position such that it is horizontal and in contact with the ground surface.

The seventh embodiment of the advanced rollback wheel-lift in accord with the present invention is shown in FIG. 17, wherein a link arm 106 connects the rear end of the base boom with the truck frame, proximate to where the tilt cylinder attaches with the truck frame.

Figure 18:
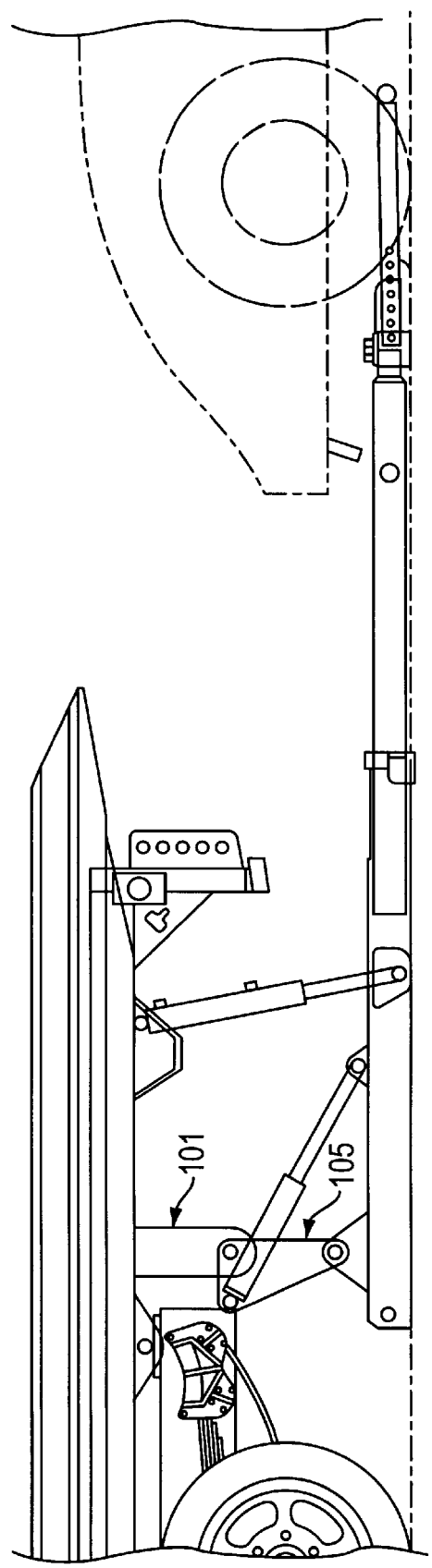
FIG. 18 is a side view of the eighth embodiment of the wheel-lift apparatus attached below the rollback truck subframe, wherein the wheel-lift is in a loading position such that it is horizontal and in contact with the ground surface.

The eighth embodiment of the advanced rollback wheel-lift in accord with the present invention is shown in FIG. 18, wherein a support 101 coupled with a triangle link 105 connects the middle portion of the base boom with the truck frame. The tilt cylinder is connected to the truck frame by way of the support 101.

Figure 19:
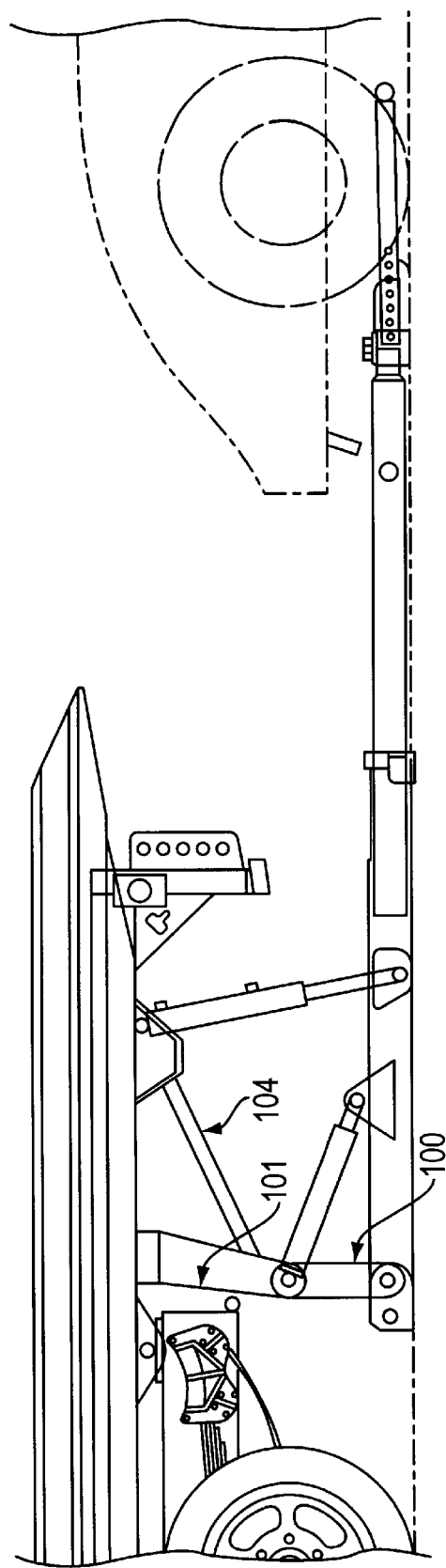
FIG. 19 is a side view of the ninth embodiment of the wheel-lift apparatus attached below the rollback truck subframe, wherein the wheel-lift is in a loading position such that it is horizontal and in contact with the ground surface.

The ninth embodiment of the advanced rollback wheel-lift in accord with the present invention is shown in FIG. 19, wherein a support 101 coupled with a pair of links 100 connects the middle portion of the base boom with the truck frame. The tilt cylinder is connected to the truck frame by way of the support 101.

Figure 20:
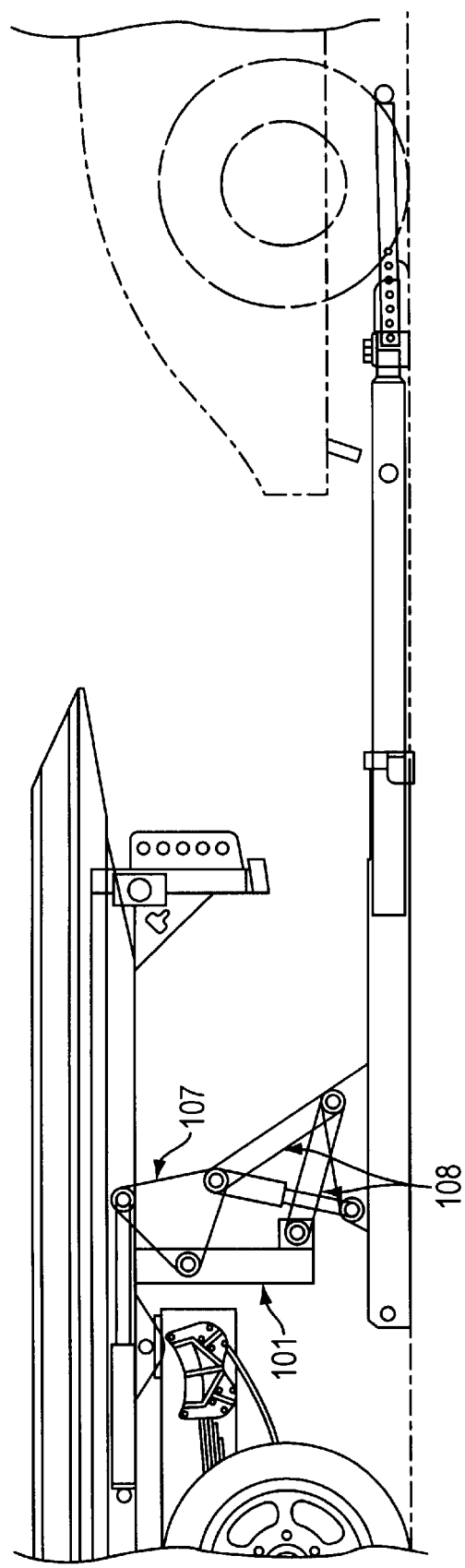
FIG. 20 is a side view of the twentieth embodiment of the wheel-lift apparatus attached below the rollback truck subframe, wherein the wheel-lift is in a loading position such that it is horizontal and in contact with the ground surface.

The tenth embodiment of the advanced rollback wheel-lift in accord with the present invention is shown in FIG. 20, wherein a support 101 and a pair of triangle arms 107 is attached to the tuck frame. In turn, a tilt cylinder and the link arms 106,108 connect the support 101 and pair of triangle arms 107 to the front end of the base boom.

The embodiments described above provide a number of significant advantages. For example, the wheel-lift apparatus operates a boom in the horizontal or "low angle" loading position having a significant extension length whereby the risk of damage to the chassis or frame of the disabled vehicle due to contact between the boom or wheel supporting cradle and the frame/chassis is greatly diminished compared with the prior art cited above.

The advantages of the present inventions is accomplished by the providing the additional cylinder(s), i.e., the tilt cylinder(s) 58, in the wheel-lift apparatus boom design. The benefit of the additional cylinder(s) provides the capability of the base boom 55 to have both its outer and inner ends to move either in relative uniformity with or independently from each other such that the base boom 55 remains horizontal to the ground G. In absence of the existence of the tilt cylinder 58, as such the case with the prior art, the inner end of the base boom 55 is fixed to move only pivotally while only allowing the outer end of the base boom 55 to move vertically via the lift cylinder 59. The end result is that the prior art base boom operates having a greater slope. The present invention provides a tremendous advantage over the prior art as a result of having its various booms and wheel supporting cradle 70 capable of approaching the disabled vehicles at a horizontal, low angle, loading and carrying positions.

Of course, it should be understood, that a wide range of changes and modifications can be made to the preferred embodiments described above. It is therefore intended that the foregoing detailed description be regarded as illustrative rather than limiting and that it is to be understood that it is the following claims, including all equivalents, which are intended to define the scope of the invention.

What is claimed:

1. A wheel-lift apparatus for use on a transport vehicle having a rollback deck slidably mounted on a deck subframe and for loading and towing a disabled vehicle, said wheel-lift apparatus comprising:
   a base boom having a fly boom telescopically extendable from a rear end of said base boom by an extension cylinder,
   a tilt cylinder with a first end attached to a front end of the base boom and a second end suitable for attachment to the deck subframe, and the tilt cylinder being suitable for moving the base and fly booms between load and tow positions,
   a lift cylinder with a first end attached to the rear end of the base boom and a second end suitable for attachment to the deck subframe at a position distal from the second end of the tilt cylinder, and the lift cylinder being suitable for moving the base and fly booms between the load and tow positions,
   a wheel supporting cradle attached to a rear end of the fly boom distal from the rear end of the base boom, the wheel supporting cradle being configured to receive and secure wheels of said disabled vehicle, and
   said tilt cylinder in combination with said lift cylinder suitable for providing low angle base and fly boom positions for loading and towing said disabled vehicle.

2. A wheel-lift apparatus according to claim 1, further comprising:
   a telescoping tilt boom with a top end suitable for attachment to the deck subframe and a bottom end attached to the front end of the base boom; and
   with said tilt cylinder being positioned and attached within said tilt boom, and said tilt boom being extendable and retractable by action of said tilt cylinder between the load and tow positions, respectively.

3. A wheel-lift apparatus according to claim 1, wherein said base boom and said fly boom are suitable for operation in the loading position at an angle below horizontal of about 0.0 to about 15.0 degrees.

4. A wheel-lift apparatus according to claim 1, wherein said base boom and said fly boom are suitable for operation in the tow position at an angle above horizontal of about 0.0 to about 15.0 degrees.

5. A wheel-lift apparatus according to claim 1, wherein the first end of the lift cylinder is attached to a first side of the rear end of the base boom, and the wheel-lift apparatus further comprises a second lift cylinder with a first end attached to a second side of the rear end of the base boom and a second end suitable for attachment to the deck subframe, and the second lift cylinder being suitable for moving the base and fly booms between the load and tow positions.

6. A wheel-lift apparatus according to claim 1, further comprising:
   a support having an upper end that is suitable for attachment to the deck subframe; and
   a link having an upper end attached to the lower end of the support and a lower end attached to the front end of the base boom.

7. A wheel-lift apparatus according to claim 6, wherein the first end of the tilt cylinder is directly attached to the link.

8. A wheel-lift apparatus according to claim 6, wherein the link comprises a pair of links with a first link having an upper end attached to a first side of the lower end of the support and a lower end attached to a first side of the front end of the base boom, and a second link having an upper end attached to a second side of the lower end of the support and a lower end attached to a second side of the front end of the base boom.

9. A wheel-lift apparatus according to claim 1, further comprising a link arm having an upper end suitable for attachment to the deck subframe and a lower end attached to the base boom.

10. A wheel-lift apparatus according to claim 1, further comprising:
    a first support strut with a first end attached to a first side of the front end of the base boom, and a second end suitable for attachment to the deck subframe; and
    a second support strut with a first end attached to a second side of the front end of the base boom, and a second end suitable for attachment to the deck subframe.

11. A transport vehicle for transporting disabled vehicles, said transport vehicle comprising a chassis, a rollback deck apparatus for loading and transporting a first disabled vehicle, and a wheel-lift apparatus for loading and towing a second disabled vehicle,
    said rollback deck apparatus comprising:
       a deck, and
       a deck subframe,
       said deck being slidably mounted on the deck subframe such that the deck slides between a forward transporting position and a rearward preloading position by at least one deck cylinder, and
       said deck subframe being pivotally attached to the chassis such that, when the deck is at the preloading position, the deck subframe pivots relative to the chassis between a position at which it extends generally parallel to the chassis and a loading position at which it extends at an angle relative to the chassis such that a rear end of the deck contacts the ground for loading the first disabled vehicle, and
    wherein the wheel-lift apparatus comprises:
       a base boom having a fly boom telescopically extendable from a rear end of said base boom by a boom cylinder,
       a tilt cylinder with a first end attached to a front end of the base boom and a second end attached to the deck subframe, and the tilt cylinder being suitable for moving the base and fly booms between load and tow positions,
       a lift cylinder with a first end attached to the rear end of the base boom and a second end attached to the deck subframe at a position distal from the second end of the tilt cylinder, and the lift cylinder being suitable for moving the base and fly booms between the load and tow positions,
       a wheel supporting cradle attached to a rear end of the fly boom distal from the rear end of the base boom, said wheel supporting cradle being configured to receive and secure wheels of said second disabled vehicle, and said tilt cylinder in combination with said lift cylinder providing low angle base and fly boom positions for loading and towing said second disabled vehicle.

12. A transport vehicle according to claim 11, further comprising:

a telescoping tilt boom with a top end attached to the deck subframe and a bottom end attached to the front end of the base boom; and with said tilt cylinder being positioned and attached within said tilt boom, and said tilt boom being extendable and retractable by action of said tilt cylinder between the load and tow positions, respectively.

13. A transport vehicle according to claim 11, wherein the wheel-lift apparatus further comprises:

a first support strut with a first end attached to a first side of the front end of the base boom, and a second end attached to the deck subframe; and a second support strut with a first end attached to a second side of the front end of the base boom, and a second end attached to the deck subframe.

14. A transport vehicle according to claim 11, wherein the wheel-lift apparatus further comprises:

a support having an upper end attached to the deck subframe; and a link having an upper end attached to a lower end of the support and a lower end attached to the front end of the base boom.

15. A transport vehicle according to claim 14, wherein the first end of the tilt cylinder is directly attached to the link.

16. A transport vehicle according to claim 14, wherein the link comprises a pair of links with a first link having an upper end attached to a first side of the lower end of the support and a lower end attached to a first side of the front end of the base boom, and a second link having an upper end attached to a second side of the lower end of the support and a lower end attached to a second side of the front end of the base boom.

17. A transport vehicle according to claim 11, further comprising a link arm having an upper end attached to the deck subframe and a lower end attached to the base boom.

18. A boom assembly suitable for use in a wheel-lift apparatus of a transport vehicle having a rollback deck slidably mounted on a deck subframe, said boom assembly comprising:

a base boom having a fly boom telescopically extendable from a rear end of the base boom by an extension cylinder;

a tilt cylinder with a first end attached to a front end of the base boom and a second end suitable for attachment to the deck subframe, and the tilt cylinder being suitable for moving the base and fly booms between load and tow positions;

a lift cylinder with a first end attached to the rear end of the base boom and a second end suitable for attachment to the deck subframe at a position distal from the second end of the tilt cylinder, and the lift cylinder being suitable for moving the base and fly booms between the load and tow positions, said tilt cylinder in combination with said lift cylinder suitable for providing low angle base and fly boom positions for loading and towing said disabled vehicle.

19. A boom assembly according to claim 18, further comprising:

a telescoping tilt boom with a top end suitable for attachment to the deck subframe and a bottom end attached to the front end of the base boom; and with the tilt cylinder being positioned and attached within the tilt boom, and the tilt boom being extendable and retractable by action of the tilt cylinder between the load and tow positions, respectively.

20. A boom assembly according to claim 18, wherein the base and fly booms are suitable for operation in the loading position at an angle below horizontal of about 0.0 to about 15.0 degrees.

21. A boom assembly according to claim 18, wherein the base and fly booms are suitable for operation in the tow position at an angle above horizontal of about 0.0 to about 15.0 degrees.

22. A boom assembly according to claim 18, wherein the first end of the lift cylinder is attached to a first side of the rear end of the base boom, and the wheel-lift apparatus further comprises a second lift cylinder with a first end attached to a second side of the rear end of the base boom and a second end suitable for attachment to the deck subframe, and the second lift cylinder being suitable for moving the base and fly booms between the load and tow positions.

* * * * *